United States Patent
Wiklof

(10) Patent No.: US 10,847,184 B2
(45) Date of Patent: Nov. 24, 2020

(54) METHOD AND APPARATUS FOR INITIATING A LIVE VIDEO STREAM TRANSMISSION

(71) Applicant: KNAPP INVESTMENT COMPANY LIMITED, Road Town (VG)

(72) Inventor: Christopher A. Wiklof, Everett, WA (US)

(73) Assignee: KNAPP INVESTMENT COMPANY LIMITED, Road Town (VG)

(*) Notice: Subject to any disclaimer, the term of this patent is extended or adjusted under 35 U.S.C. 154(b) by 0 days.

(21) Appl. No.: 15/689,844

(22) Filed: Aug. 29, 2017

(65) Prior Publication Data

US 2017/0358322 A1 Dec. 14, 2017

Related U.S. Application Data

(63) Continuation-in-part of application No. 14/562,033, filed on Dec. 5, 2014, which is a continuation of application No. 12/554,656, filed on Sep. 4, 2009, now Pat. No. 8,942,533, which is a continuation of application No. PCT/US2008/003174, filed on Mar. 7, 2008.

(60) Provisional application No. 60/905,746, filed on Mar. 7, 2007, provisional application No. 62/439,853, filed on Dec. 28, 2016.

(51) Int. Cl.
| | |
|---|---|
| *G11B 27/00* | (2006.01) |
| *H04N 5/77* | (2006.01) |
| *H04N 1/00* | (2006.01) |
| *H04N 1/21* | (2006.01) |
| *H04N 5/232* | (2006.01) |
| *H04N 101/00* | (2006.01) |

(52) U.S. Cl.
CPC ....... *G11B 27/005* (2013.01); *H04N 1/00933* (2013.01); *H04N 1/215* (2013.01); *H04N 1/2112* (2013.01); *H04N 1/2141* (2013.01); *H04N 5/232* (2013.01); *H04N 5/772* (2013.01); *H04N 2101/00* (2013.01); *H04N 2201/0084* (2013.01)

(58) Field of Classification Search
None
See application file for complete search history.

(56) References Cited

U.S. PATENT DOCUMENTS

| | | | |
|---|---|---|---|
| 4,939,652 A | 7/1990 | Steiner | |
| 5,845,240 A * | 12/1998 | Fielder | G11B 20/10527 704/201 |
| 5,995,936 A | 11/1999 | Brais et al. | |

(Continued)

FOREIGN PATENT DOCUMENTS

| | | |
|---|---|---|
| EP | 01017240 | 5/2001 |
| JP | 2006-127206 | 5/2006 |

(Continued)

OTHER PUBLICATIONS

PCT International Search Report and Written Opinion of PCT Application No. PCT/US2008/003174 dated Mar. 7, 2008.

*Primary Examiner* — Hung Q Dang

(57) ABSTRACT

An apparatus, system, and method allow a user to initiate a live stream that includes retrospectively captured images. Initiating the live stream includes providing provisional data that includes retrospectively captured images to a wireless radio.

23 Claims, 8 Drawing Sheets

(56) References Cited

U.S. PATENT DOCUMENTS

| | | | |
|---|---|---|---|
| 6,009,036 A | 12/1999 | Takasugi | |
| 6,307,526 B1 | 10/2001 | Mann | |
| 6,847,336 B1 | 1/2005 | Lemelson et al. | |
| 6,879,340 B1 | 4/2005 | Chevallier | |
| 2002/0005895 A1 | 1/2002 | Freeman et al. | |
| 2002/0085843 A1* | 7/2002 | Mann | E03C 1/057 396/374 |
| 2002/0191952 A1 | 12/2002 | Fiore et al. | |
| 2003/0040917 A1 | 2/2003 | Fiedler | |
| 2003/0112347 A1* | 6/2003 | Wyman | H04N 5/772 348/231.99 |
| 2004/0013406 A1 | 1/2004 | Barton et al. | |
| 2004/0028381 A1 | 2/2004 | Kim | |
| 2004/0039838 A1* | 2/2004 | Gopalakrishnan | H04L 67/02 709/236 |
| 2004/0061788 A1* | 4/2004 | Bateman | H04N 5/232 348/220.1 |
| 2004/0075753 A1* | 4/2004 | Thorland | H04N 5/772 348/231.6 |
| 2004/0135900 A1* | 7/2004 | Pyle | H04N 1/00912 348/231.3 |
| 2004/0156616 A1 | 8/2004 | Strub et al. | |
| 2004/0172177 A1 | 9/2004 | Nagai et al. | |
| 2006/0018630 A1 | 1/2006 | Jacovi et al. | |
| 2006/0045468 A1 | 3/2006 | Okazaki et al. | |
| 2006/0077256 A1 | 4/2006 | Silvemail et al. | |
| 2006/0164534 A1 | 7/2006 | Robinson et al. | |
| 2007/0217761 A1* | 9/2007 | Chen | H04N 9/79 386/228 |
| 2008/0094476 A1* | 4/2008 | Whitehead | H04N 5/232 348/207.1 |
| 2008/0144906 A1 | 6/2008 | Allred et al. | |
| 2008/0198243 A1* | 8/2008 | Kijima | H04N 1/2112 348/231.99 |
| 2010/0171833 A1* | 7/2010 | Chalmers | G08B 13/196 348/159 |
| 2013/0101219 A1* | 4/2013 | Bosworth | G06K 9/00677 382/195 |
| 2013/0202274 A1* | 8/2013 | Chan | H04N 5/77 386/362 |
| 2013/0332804 A1* | 12/2013 | Seaman | G06F 17/243 715/201 |
| 2015/0234787 A1* | 8/2015 | Itamoto | G06F 17/211 715/204 |
| 2015/0373617 A1* | 12/2015 | Cho | H04W 40/12 370/329 |
| 2016/0182850 A1* | 6/2016 | Thompson | H04N 9/8205 348/158 |
| 2016/0217325 A1* | 7/2016 | Bose | G11B 27/17 |
| 2017/0059265 A1* | 3/2017 | Winter | F41A 17/08 |
| 2017/0078767 A1* | 3/2017 | Borel | H04N 21/8549 |
| 2017/0237896 A1* | 8/2017 | Tsai | H04N 5/23216 348/231.99 |
| 2017/0284754 A1* | 10/2017 | Chakraborty | F41J 5/10 |
| 2018/0165835 A1* | 6/2018 | Berge | H04N 1/212 |
| 2018/0174343 A1* | 6/2018 | Slater | G06T 5/50 |
| 2018/0176607 A1* | 6/2018 | Shaw | H04N 21/2187 |

FOREIGN PATENT DOCUMENTS

| | | |
|---|---|---|
| KR | 10-2000-0047062 | 7/2000 |
| KR | 10-2000-0051776 | 8/2000 |
| WO | WO 1992/022983 | 12/1992 |

* cited by examiner

METHOD AND APPARATUS FOR INITIATING A LIVE VIDEO STREAM TRANSMISSION

CROSS REFERENCE TO RELATED APPLICATIONS

The present application claims priority benefit from U.S. Provisional Application No. 62/439,853, entitled "METHOD AND APPARATUS FOR INITIATING A LIVE VIDEO STREAM TRANSMISSION," filed Dec. 28, 2016. The present application is a continuation-in-part of U.S. patent application Ser. No. 14/562,033, entitled "RECORDER AND METHOD FOR RETROSPECTIVE CAPTURE," filed Dec. 5, 2014, which is a continuation application of U.S. patent application Ser. No. 12/554,656, entitled "RECORDER WITH RETROSPECTIVE CAPTURE," filed Sep. 4, 2009, now U.S. Pat. No. 8,942,533, issued Jan. 27, 2015, which is a continuation application of International Patent Application No. PCT/US2008/003174, entitled "RECORDER WITH RETROSPECTIVE CAPTURE," filed Mar. 7, 2008, which claims priority from U.S. Provisional Application No. 60/905,746, entitled "RECORDER WITH RETROSPECTIVE CAPTURE," filed Mar. 7, 2007. U.S. Provisional Patent Application No. 62/439,853, U.S. Continuation application Ser. No. 14/562,033, U.S. Continuation application Ser. No. 12/554,656 (now U.S. Pat. No. 8,942,533), International Patent Application No. PCT/US2008/003174, and U.S. Provisional Patent Application No. 60/905,746, are each, to the extent not inconsistent with the disclosure herein, incorporated by reference.

BACKGROUND

In the use of conventional digital still cameras, conventional video cameras, and conventional sound recorders, the user may be disappointed because they fail to activate the shutter or record command button just prior to or substantially simultaneously with a scene, utterance, or other real time event desired to be recorded. This disappointment may arise because the user does not anticipate the real time event prior to its occurrence or is otherwise distracted and does not press the shutter or record button in time to record the event.

In other cases where recording is substantially continuous, the resultant recording is so voluminous as to defy a cursory attempt to find the portion of the recording corresponding to a real time event at a subsequent viewing, listening or editing session. Instead, the user must search, frequently rather laboriously, to find the fleeting event in the voluminous entirety of the recording.

In still other cases, even when a real time event is captured, a recording of events leading up to the real time event is not captured, and thus context corresponding to the captured scene, utterance, or other real time event may be lost.

OVERVIEW

In a first example embodiment according to the invention, a method includes continuously capturing a stream of image using a capture element of a portable video recorder. The portable video recorder may be included in a mobile device such as a smartphone or a tablet. The capture element may be a CMOS image sensor. The method includes simultaneously presenting the stream of images to a user and transmitting the captured stream of images to a provisional memory of the portable video recorder. Each image of the stream of images is held for only a period of time as provisional data in the provisional memory included in the portable video recorder. A user-initiated trigger signal is received from a user interface included in the portable video recorder. Upon receiving the user-initiated trigger signal, a live stream session is initiated that includes a selected portion of the provisional data stored in the provisional memory. Still referring to the first embodiment, initiating the live stream session includes sending the selected portion of the provisional data from the provisional memory to a wireless radio of the portable video recorder. The selected portion of the provisional data corresponds only to events captured prior to receiving the user-initiated trigger signal.

In some embodiments, a subsequent stream of images is captured subsequent to receiving the user-initiated trigger signal and the subsequent stream of images is also sent to the wireless radio as part of the live stream session. The subsequent stream of images follows the selected portion of the provisional data in the live stream session.

In a second example embodiment, a portable video recorder includes a capture element, a provisional memory, a wireless radio, and a user interface. The capture element is configured to produce a continuous stream of video data. The provisional memory is configured to receive the continuous stream of video data as provisional data from the capture element and hold the provisional data for only a span of time after the receipt of the provisional data. The wireless radio is configured to communicate with a wireless node. The user interface is configured to receive a command from a user to initiate a live stream session that includes at least a portion of the provisional data. Initiating the live stream session includes transmitting the at least a portion of the provisional data to the wireless radio.

In some embodiments, the wireless radio is configured to wirelessly transmit the live stream session as cellular data, WiFi, or Bluetooth.

DETAILED DESCRIPTION

Figure 1:
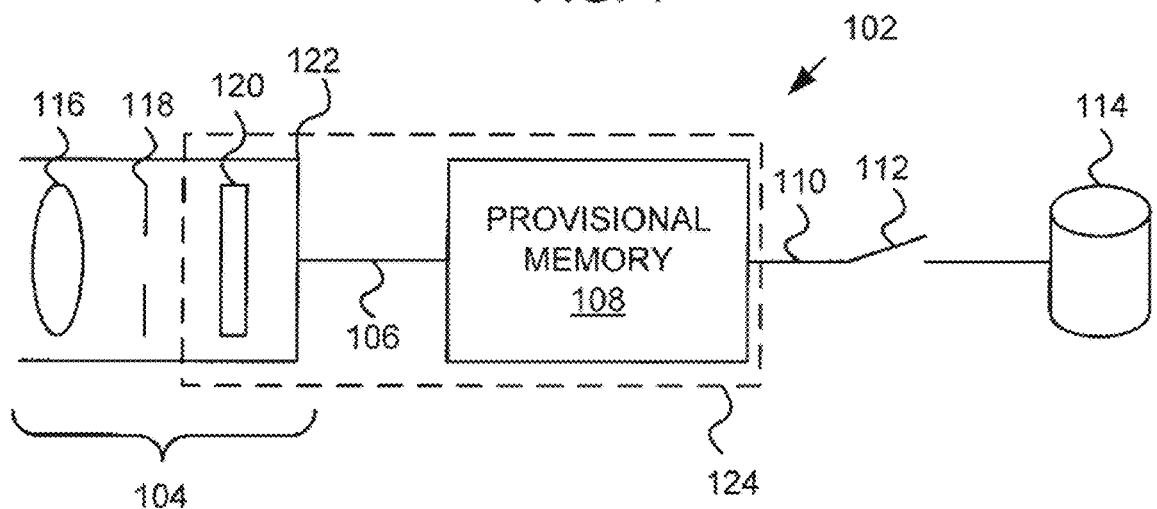
FIG. 1 is a block diagram of a retrospective recorder, according to an embodiment.

In the following detailed description, reference is made to the accompanying drawings, which form a part hereof. In the drawings, similar symbols typically identify similar components, unless context dictates otherwise. Other embodiments may be used and/or and other changes may be made without departing from the spirit or scope of the disclosure.

A numbering convention to facilitate easy understanding by the reader is used herein. Figures are numbered in conventional consecutive order. Specific features are generally indexed consecutively using three or four digit numbers in the order described. The first one or two digits correspond to the figure number in which the feature is first described. Features having similar functionality generally retain their originally assigned number throughout, even though their physical or logical appearance may vary considerably from figure to figure.

As used herein, the terms image, recorder, and image signal may refer respectively to various observable phenomena, devices or transducers for capturing such phenomena, and signals output by such capture apparatuses or devices corresponding to the captured phenomena. For example, in an illustrative embodiment, an image may include a visible field-of-view, a corresponding recorder may include a digital camera, and the corresponding image signal may include an electrical signal carrying the captured data, such as a serial or parallel sequence of voltage or current transitions communicated from the digital camera to a buffer memory or a storage apparatus. The image may be still or video and/or may include audio. According to another illustrative embodiment, the image may be purely audio with the recorder being a microphone and the image signal being, for example, an electrical representation of the microphone output. To facilitate ease of understanding the term "image" may be used as shorthand to indicate both an original real-time observed phenomenon and an electrical signal or data representative of the observed phenomenon.

As used herein, the term "permanent" is used not only to denote a substantially irreversible action, such as recording an image onto a writable optical disc, but also to denote an action that is permanent in a relative sense, such as recording an image into an area of persistent random-access memory (RAM), recording onto flash memory, writing to rotating magnetic memory, etc. Thus, references to "storage" may be taken to include both conventional storage apparatuses and media such as a hard drive, and to functionally persistent memory such as, for example, a volatile memory device that is refreshed to keep the image in memory for more than a relatively transient duration.

Referring now to FIG. 1, an embodiment of a retrospective recorder 102 is shown in block diagram form. A capture apparatus 104, here illustrated as a digital camera or video recorder, may be operable to output an image signal representative of a captured image to a provisional memory 108 via a data channel 106. For example, the image signal may include a raw or compressed stream of video frames, such as in AVI video envelopes. According to an embodiment, the image data may be loaded into the memory 108 as a sequence of linked groups, each group including a reference frame and a header formatted for playback starting from the present group. According to an embodiment, the memory 108 may be configured as a first-in-first-out (FIFO) buffer memory configured to overflow the oldest group for each new group received. The memory 108 may be configured to substantially continuously accept image signals from the image capture apparatus 104.

The data channel 106 may be considered to transmit "provisional" images from the image capture apparatus 104. Similarly, the memory circuit 108 may be considered to include "provisional memory" configured to temporarily hold provisional image data corresponding to provisionally captured video images. According to embodiments, the provisional memory 108 may include a first-in-first-out (FIFO) memory configured to overflow the oldest data or a circular buffer configured to overwrite the oldest data, for example.

For the example of FIG. 1, capture apparatus 104 is shown as a digital camera that includes a lens 116, an aperture 118, and a light sensor array 120, all held in alignment by housing 122. As may be seen, such an apparatus may include a conventional digital still or digital video image sensor, and may be constructed according to a range of architectures.

When provisional capture is initiated, an image signal begins to be transmitted from the capture device 104 over signal line, node, or terminal 106 to memory circuitry 108. As time progresses, memory 108 fills up and the first-captured image is shifted out of the memory 108 through node or terminal 110 and is discarded. Alternatively, the newest provisionally captured image may overwrite the oldest provisionally captured image.

The data capacity of, and hence the amount of time for which provisional images are temporarily held in memory 108 may be determined according to application requirements, recorder cost and size constraints, power consumption, etc. For the case of a series of discrete images, the data capacity of memory 108 affects the number of discrete images that may be temporarily held. According to some embodiments, the provisional memory 108 capacity may be dynamically allocated according to user preferences, image attributes, or other operational considerations.

Furthermore, the rate of provisional image capture performed by the capture apparatus 104 and the quality of the provisional images captured by the capture apparatus 104 may be dynamically determined according to user preferences, image attributes, sensed values (e.g. acceleration, finger pressure, etc.), or other operational considerations.

According to an embodiment, at least a portion of the image capture apparatus 102 including the image sensor 120, the image signal line, node, or terminal 106, and the provisional memory circuitry 108 may be integrated into a module 124, such as an integrated circuit. An integrated embodiment, which may optionally include processing logic such as image compression hardware (not shown) and local control logic such as a state machine (not shown), may be advantageous with respect to size, power consumption, cost, etc. and may allow the apparatus to remain in a provisional capture state for a relatively extended period of time with minimal battery requirements. According to an embodiment, an apparatus operable to draw power from the environment, such as a photovoltaic apparatus, heat pump, electromechanical inductive charger, etc. (not shown) may be coupled to a capture apparatus 104, optional compression hardware (not shown), provisional memory 108, and other optional components such as control logic, sensor(s), etc. (not shown) to remain in the provisional capture state for extended periods of time.

As may be appreciated, the memory 108 at any instant in time after initiation of the provisional capture state holds a record of previously received images. In the case of a digital video camera, such a historical record may include, for example, 1 to 60 seconds of previously captured images. As indicated above, such previously recorded images are written-over or overflowed and discarded while the system stays in the provisional capture state of operation.

In the event a user decides that the images are to be saved, the overflow terminal 110 may be operatively coupled to a storage element 114 by a coupling device 112. The coupling device may, for example, be actuated by a user command such as a shutter button, touch-screen interaction, or trigger press. When the coupling device 112 couples the output terminal to a storage element 114, the provisional images are transmitted out of provisional memory 108 and into storage 114. In the example of FIG. 1, this event may be envisioned as closing a user-activated switch 112 to couple the output line 110 of memory 108 to storage element 114. Alternative interfaces between memory 108 and storage 114 such as bus-mediated serial or parallel data transfer; transistors, relays, or other controllable connections, etc. may be used. Images coupled to storage 114 are thus captured "permanently" as with a conventional digital camera or digital video recorder.

The period during which images are cached in memory 108, inter alia, allows a user time to respond to and record a dynamic event that would otherwise have been missed. To a user, pressing the shutter button or trigger performs what seems like capturing an image of the past (or at least capturing data beginning from a moment earlier than the real time moment the user activated the coupling device 112).

Thus, according to embodiments, baby's first steps, an athletic achievement, a spectacular "wipe-out", a noteworthy quote, or other transient event may be captured without requiring storage and later editing of large amounts of data. According to embodiments, a portable image or voice capture system may remain in provisional capture mode for an extended period of time without allocating large amounts of non-volatile memory to data that would need to be later deleted. Non-volatile memory or storage is only allocated to image (audio, etc.) storage when the provisionally captured real time event possesses qualities that the user judges to merit allocation of non-volatile memory or storage.

As indicated above, the capture apparatus 104 and provisional memory 108 may, according to some embodiments, be integrated and made very low power. Actions that require more power, such as transmitting and/or permanently storing the image signal, may thus be eliminated during provisional image capture, reducing overall power consumption and enhancing battery life compared to conventional recorders that only permanently record images.

According to embodiments, the capture apparatus 102 and other variants may include a digital hand-held still camera, a digital hand-held video camera, a camera phone, a computer with web-cam, a digital voice recorder, a head-mounted camera, a wireless headset, a tablet computer, or other apparatus with a recording capability.

Figure 2:
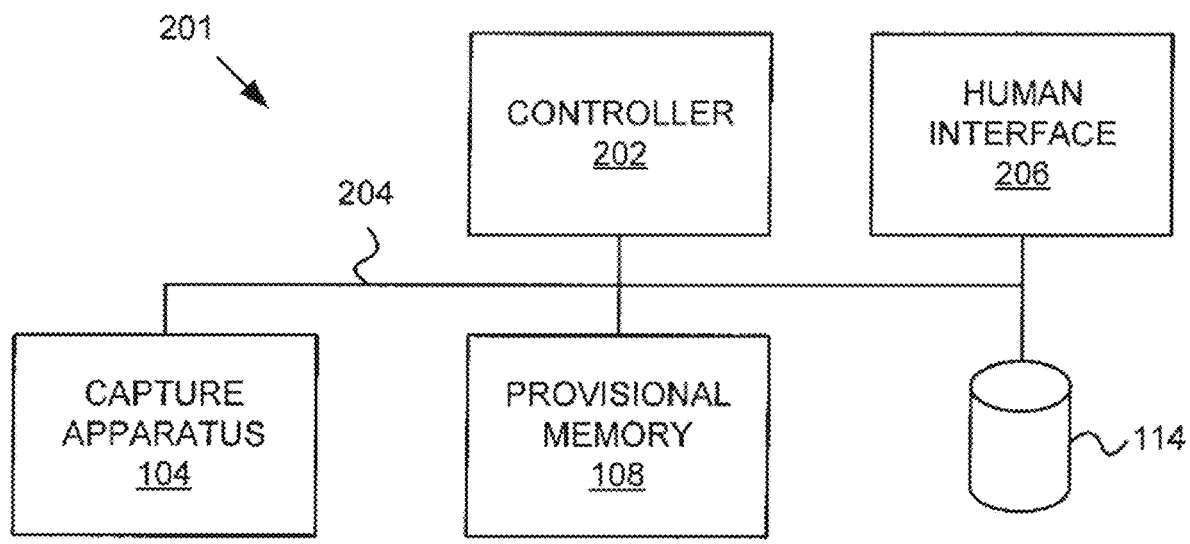
FIG. 2 is a block diagram of a retrospective recorder, according to another embodiment.

FIG. 2 illustrates a retrospective recorder 201 having an electronic controller 202, such as a microcontroller, interconnected with the capture apparatus 104, provisional memory 108, human interface 206, and storage apparatus 114 via a bus 204. According to an embodiment, the human interface may include a record switch, shutter button, touch-screen interface, trigger, etc. configured to select the operating mode. When the user selects a provisional capture mode, the captured signal from the capture apparatus 104 may be loaded into the provisional memory 108, which then overflows or is overwritten while the retrospective recorder 201 remains in provisional capture mode. When the user recognizes that the real time actions (which have been provisionally captured) warrant permanent recording, the user may activate the human interface to change to a recording mode of operation. When the record mode is entered, provisional data from the provisional memory may be transferred to storage memory 114 as the capture apparatus 104 continues to capture the action.

For example, in the record mode, the microcontroller 202 may transfer provisional images from the provisional memory 108 to the storage 114 across the bus 204. Alternatively, for embodiments where provisional image memory and the image storage are implemented as one or an array of physical devices, microcontroller 202 may, when a "record" command is received, allocate memory holding provisional images as storage to prevent the images from being written-over.

Figure 3:
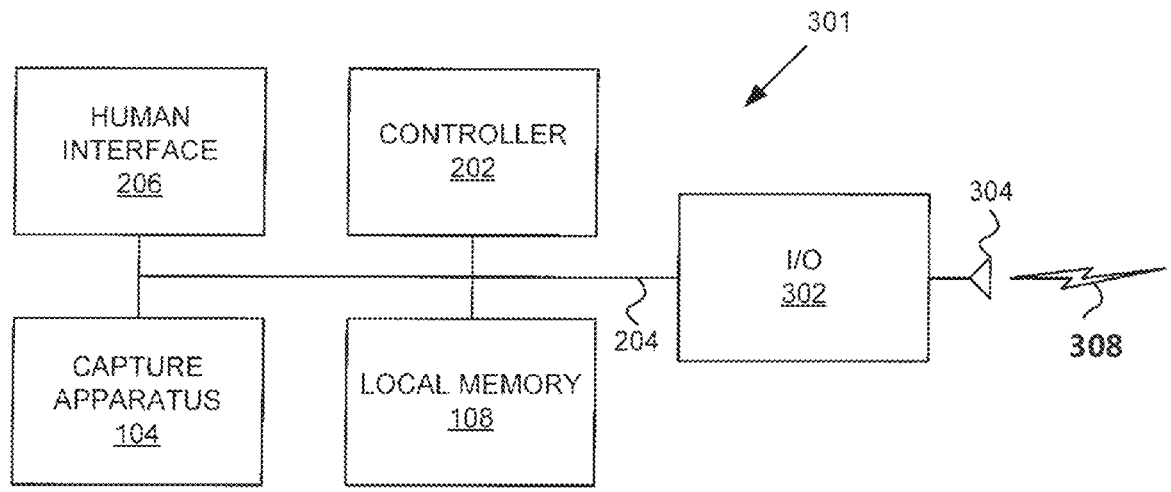
FIG. 3 is a block diagram of a retrospective recorder having local memory and an interface to remote image storage, according to an embodiment.

FIG. 3 illustrates a retrospective recorder embodiment 301 including a local capture apparatus 104, local memory 302, a local controller 202, a human interface 206, and a data interface 304 coupled together by a data bus 204. A portion of the local memory 302 may be configured as provisional memory. According to one embodiment, another or a selectable portion of the local memory 302 may be configured as permanent storage. According to another embodiment, the apparatus 301 may be substantially devoid of permanent image memory and instead, when a user command to enter record mode is received through the human interface 206, provisionally captured images are transferred out through the data interface 304 as an output signal 308. The data interface is here exemplified by a wireless interface, such as a transmitter/receiver, having an antenna 304 that is configured to transmit the image data as transmitted modulated radio signal 308. Images selected for retrospective capture may thus be permanently retained on remote storage (not shown).

According to one illustrative embodiment, the retrospective recorder 301 is embedded in a wireless communication device such as a cellular telephone, and the modulated radio signal 308 represents transmission to a conventional cellular telephone system. According to another exemplary embodiment, retrospective recorder 102 is configured as a head-mounted and/or bore-sighted video camera, and modulated radio signal 308 represents a short range signal such as a Bluetooth link, IEEE 802.11 link or other wireless link to a nearby receiving and storage apparatus. According to other embodiments, a wired interface, an infrared interface, or other non-radio interface may be substituted for the radio interface illustrated in FIG. 3.

Figure 4:
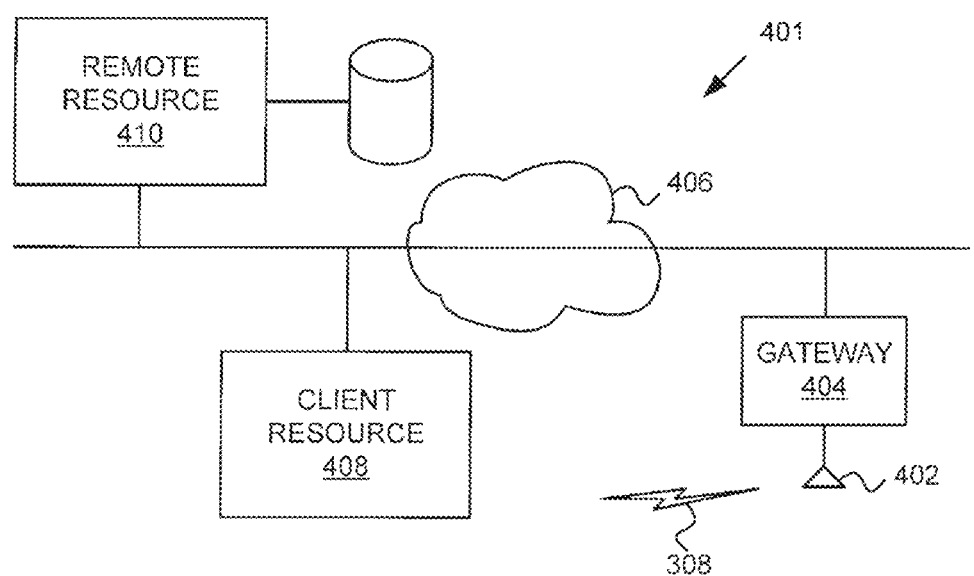
FIG. 4 is a diagram of a network equipped to receive an image from a retrospective capture device, according to an embodiment.

FIG. 4 illustrates a receiving device or network for receiving image data from a remote retrospective recorder recording device such as shown in the illustrative embodiment 301 of FIG. 3. A gateway 404, which may be a base station, a cellular receiver, an embedded interface in a portable storage device, or other embodiment, receives a wireless signal 308 containing image data through an antenna 402. The gateway 404 may transmit the received image data across an optional network 406. The image signal may be received by a client computer 408, by a server 410, or other entity. As mentioned above, in some embodiments the system 401 may be replaced by a local receiving and storing device such as a personal computer, personal data assistant, MP3 player, or other apparatus equipped to receive and record image signals.

Figure 5:
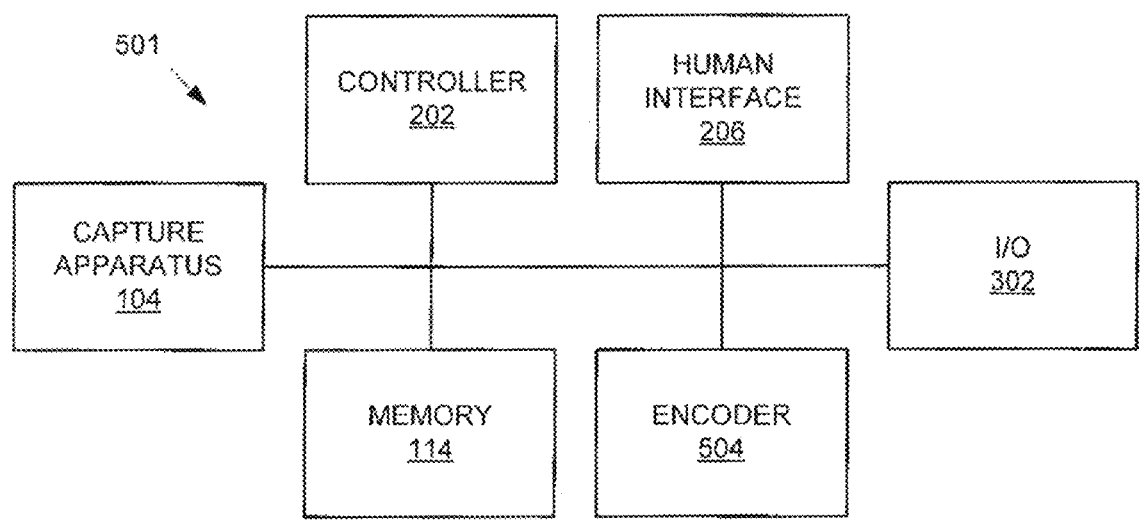
FIG. 5 is a block diagram of a retrospective recorder having an integrated memory, according to an embodiment.

FIG. 5 illustrates an alternative embodiment of a retrospective recorder 501 that does not use physically- or logically-separated provisional memory 108. Instead, a stream of images is captured by an image capture apparatus 104 and, under control of microcontroller 202, is recorded into storage 114. A user may, upon witnessing a noteworthy event, activate trigger 502. The trigger signal is received by microcontroller 202, and microcontroller activates encoder 504. According to an illustrative embodiment, an encoder 504 creates a mark indicating a moment in time and encodes the mark over the image stream in storage 114, such as by steganography. Alternatively, a mark may be encoded in an index or other facility out-of-band with respect to the recorded image signals in storage 114. Such out-of-band marks may be physically stored in storage 114 or may be stored in a separate physical apparatus. Thus, the marks provide sorting of images and may facilitate later editing and/or selection of images by directing the editor's or viewer's attention to those portions of images that were deemed noteworthy at the time of recording.

According to an embodiment, the mark references a moment in the image stream earlier than the real time moment the user activates the trigger.

According to embodiments, the image stream may consist of or include audio information.

Figure 6:
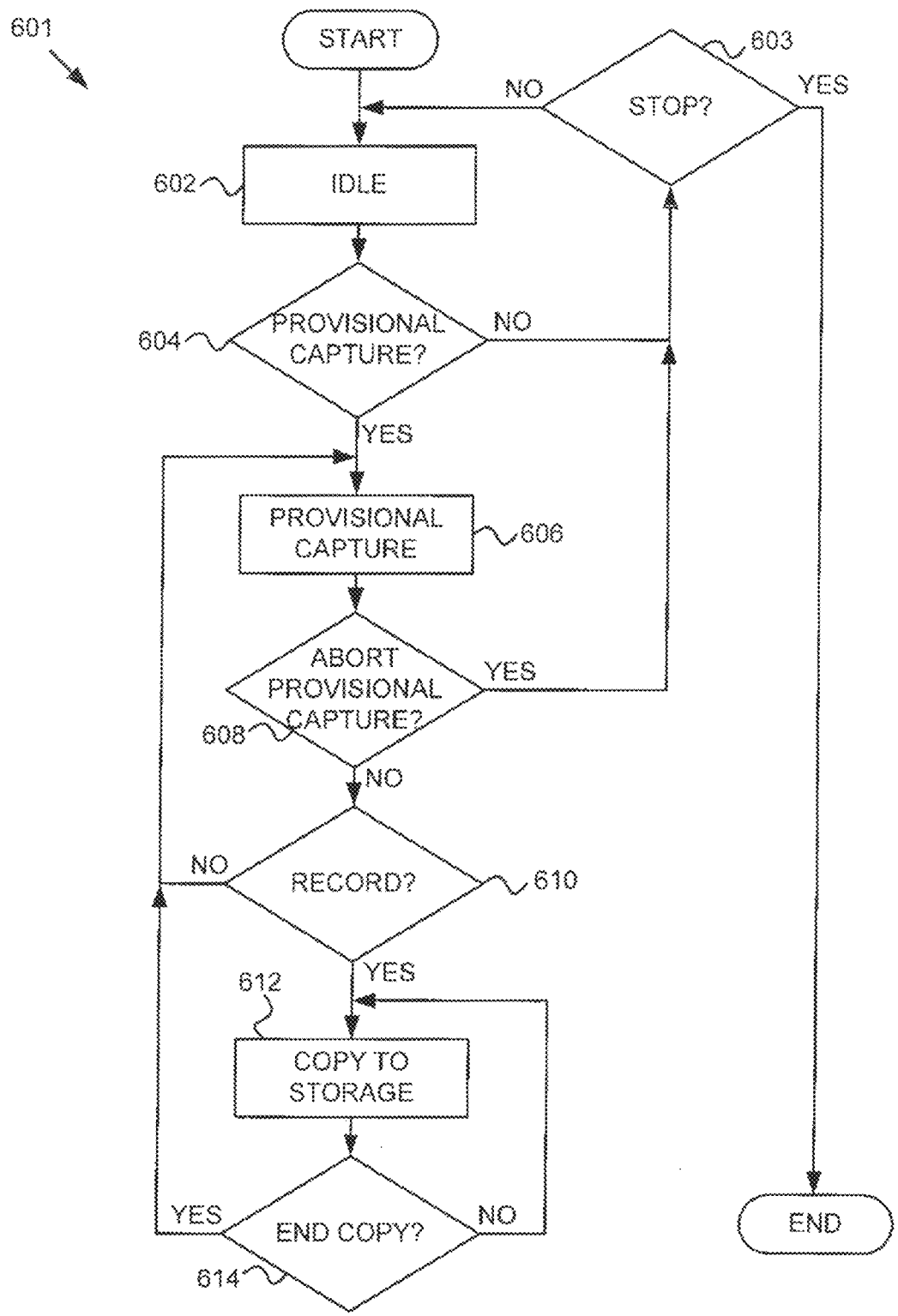
FIG. 6 is a flowchart illustrating logic for retrospectively recording according to an exemplary embodiment.

FIG. 6 is a flowchart illustrating exemplary logic 601 for moving between provisional recording and permanent recording. As shown, the recorder enters an idle state 602 when powered. In the idle state 602, the system may light meter the scene, automatically focus, zoom, set audio sensitivity, etc. Proceeding to decision step 604, system checks to determine if it has been triggered to enter a provisional capture state 606. If not instructed to enter a provisional capture state 606, the system proceeds to decision step 603 where the logic checks to determine if a stop or shutdown command has been received. If a stop command has been received, the process ends, for example by performing a shut-down or entering a sleep mode. If the stop command has not been received, the system re-enters the idle state 602.

If provisional capture is selected in decision step 604, the retrospective recorder enters provisional capture mode 606. In provisional capture mode, images, audio, etc. are provisionally captured by a capture apparatus and a temporarily cached in a provisional memory circuit as provisional data. For the case of substantially continuous images such as video or audio, images may be temporarily cached as streaming data types. For the case of discontinuous images such as where the image capture device is a digital still camera (in still camera mode), discrete images are capture by the image capture device at a frame rate that may be selected by the designer or user according to preferences, and provisionally saved as one or more of a series of discrete images.

While in the provisional capture mode 606, the system monitors inputs in decision step 608 to determine if the user wishes to abort provisional capture mode 606. If an abort command is received, the process proceeds to decision step 603, from there either back to the idle state 606 or to the shutdown or sleep state as described above. If no abort command is received, the process proceeds from step 608 to step 610, where it is determined if a command has been received to enter the record state 612. If not, the system returns to the provisional capture state 606.

If user input is received (indicating that the user wishes to permanently record the provisionally captured image or images), the process proceeds to step 612. In step 612, the system may copy images from the image cache into storage starting with the earliest provisional image. Alternatively, the shutter button or trigger input may act as a command to capture the current image at a high resolution and to transfer lower resolution provisional images to storage. Thus, a high resolution digital image may be accompanied by an earlier (and later) series of image showing events leading up to the image, set-up, posing, etc.

When the system or user issues a command to permanently store provisionally captured images as detected in decision step 610, the system enters a storage mode 612 where one or more previously captured images are written to permanent storage or otherwise designated as permanent images. Such action may be embodiment by physically copying the image signal to a separate storage device or physically segregated region of memory. Alternatively, such action may be embodied by designating regions of memory for storage of the provisionally captured images currently held.

When in storage mode 612, the system monitors for a command to end storage in decision step 614 and return to provisional capture mode 606. According to some embodiments, such a command may be interpreted as arising from release of a shutter button or trigger. Alternatively, the command to exit the storage mode may be made by a second depression of the shutter button or trigger. Alternatively, such a command may be interpreted as arising from storing all images that were substantially in the cache at the moment in time the record command 610 was received. Alternatively, the images from the capture apparatus may continue to be communicated to the storage apparatus for a timed period. Other alternatives will be apparent to those skilled in the art.

Figure 7:
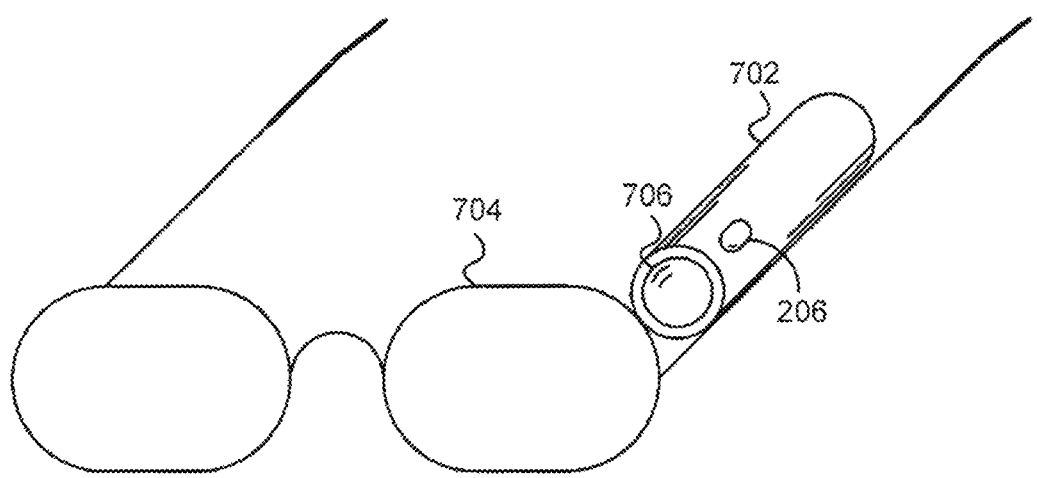
FIG. 7 is a diagram illustrating a head-mounted camera configured for retrospective recording, according to an embodiment.

FIG. 7 is a perspective view of a head-mounted and/or bore-sighted retrospective recording camera 702 mounted on eyewear 704 that may be worn by a user. The illustrative eyewear 704 may be substituted for by a helmet, headset, harness, etc. that may be worn by a user. Camera 702 includes a lens 706 for receiving and focusing light from a scene witnessed by the human wearer and a human interface 206 embodied as a button on the body of the retrospective recording camera for selecting operating modes. For example, a single click indicates the user wishes to enter provisional capture. A second single click indicates the user wishes to record. In some embodiments, an extended click causes images to be permanently recorded for as long as button 206 is depressed. In other embodiments, a second click initiates permanent recording, and images are streamed out of local memory until an "exit record mode" command is issued, such as by another click when in record mode to indicate that the user wishes to exit record mode and resume provisional capture mode. A double click may indicate that the user wishes to abort provisional capture and enter idle mode or power down the head-mounted camera 702. As illustrated in FIG. 7, the head-mounted camera may include a wireless interface for transmitting images to a remote storage apparatus. Alternatively, some or all of the storage memory may be disposed within the camera 702.

A system may include a remote storage apparatus (not shown) having integrated wireless interface, logic for receiving images across the wireless interface, and storage. The remote storage apparatus may be carried in a pocket, held by a belt clip, or otherwise retained on the body of a user. The user may, for instance, simultaneously wear the head-mounted camera apparatus 702.

Figure 8:
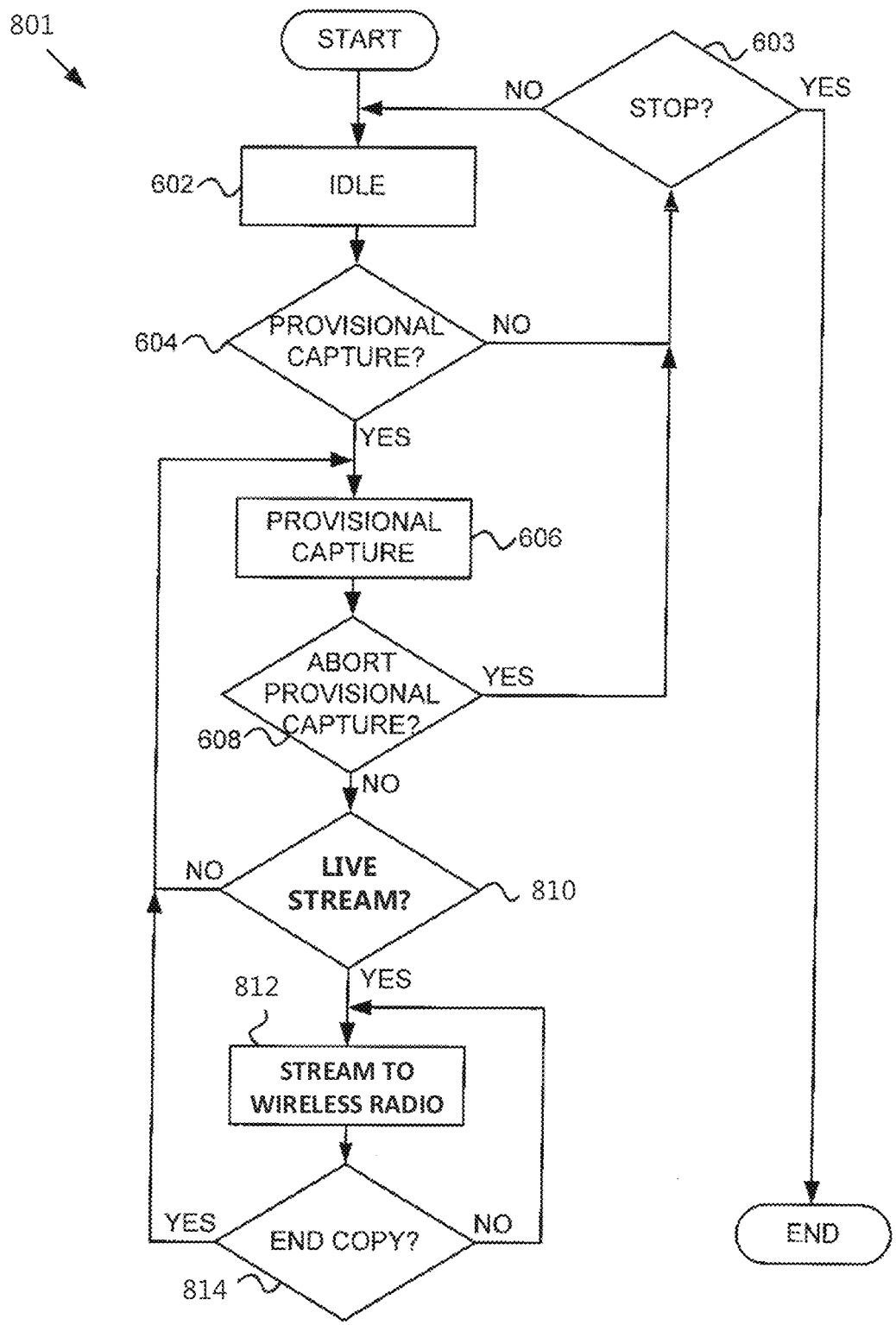
FIG. 8 is a flowchart illustrating logic for live streaming retrospectively captured images, according to an embodiment.

FIG. 8 is a flowchart illustrating logic 801 for live streaming retrospectively captured images, according to an embodiment of the disclosure. The flowchart of FIG. 8 includes some states that are similar to the states of the flowchart of FIG. 6.

As used herein, the term "live stream" or "live stream session" includes the live and substantially-live transmission of images for broadcasting purposes. A live stream that is truly live will generally include transmitting the images as soon as they are recorded and without delay. "Substantially-live" live streams or live stream sessions in this disclosure are delayed by (at least) the time period of retrospectively captured images that are transmitted as part of the live stream or live stream session. In an example where 10 seconds of retroactively captured images are transmitted as part of a live stream session, the live stream session will be delayed by at least 10 seconds, yet it will still be defined as a "live stream" or "live stream session" in accordance with this disclosure even though it is not truly live. In one embodiment, "substantially-live" includes transmitting the captured images (for broadcast purposes) to a network within five minutes of recording/capturing the images, where the network is (e.g. a server) is configured to broadcast the live stream to viewers or consumers of the content. The server may broadcast the live stream as soon as it is received or may broadcast the live stream to the viewers or consumers of the live stream when the viewers or consumers request a viewing of the live stream.

In FIG. 8, the recorder enters an idle state 602 when powered. In the idle state 602, the system may light meter the scene, automatically focus, zoom, set audio sensitivity, etc. Proceeding to decision step 604, system checks to determine if it has been triggered to enter a provisional capture state 606. A provisional capture state 606 may be triggered by a user interaction with a touch screen or a physical button, for example. If not instructed to enter a provisional capture state 606, the system proceeds to decision step 603 where the logic checks to determine if a stop or shutdown command has been received. If a stop command has been received, the process ends, for example by performing a shut-down or entering a sleep mode. If the stop command has not been received, the system re-enters the idle state 602.

If provisional capture is selected in decision step 604, the retrospective recorder enters provisional capture mode 606. In provisional capture mode, images, audio, etc. are provisionally captured by a capture apparatus and are temporarily cached in a provisional memory circuit as provisional data. For the case of substantially continuous images such as video or audio, images may be temporarily cached as streaming data types. For the case of discontinuous images such as where the image capture device is a digital still camera (in still camera mode), discrete images are captured by the image capture device at a frame rate that may be selected by the designer or user according to preferences, and provisionally saved as one or more of a series of discrete images.

While in the provisional capture mode 606, the system monitors inputs in decision step 608 to determine if the user wishes to abort provisional capture mode 606. If an abort command is received, the process proceeds to decision step 603, from there either back to the idle state 606 or to the shutdown or sleep state as described above. If no abort command is received, the process proceeds from step 608 to step 810, where it is determined if a command has been received to a live stream state 812. If not, the system returns to the provisional capture state 606.

If user input is received (indicating that the user wishes to live stream at least a portion of the provisionally captured image or images), the process proceeds to state 812. The user input may include interacting with a touch screen interface or pressing a physical button. In live stream state 812, the system may initiate a live stream session by sending some or all of the provisional data from the provisional memory to a wireless radio included within the recorder.

When in live stream mode 812, the system monitors for a command to end live streaming in decision step 814 and return to provisional capture mode 606. According to some embodiments, such a command may be interpreted as arising from release of a shutter button or trigger and/or interacting with a touch screen interface. Alternatively, the command to exit the live stream mode may be made by a second depression of the shutter button or trigger. Other alternatives will be apparent to those skilled in the art.

Figure 9B:
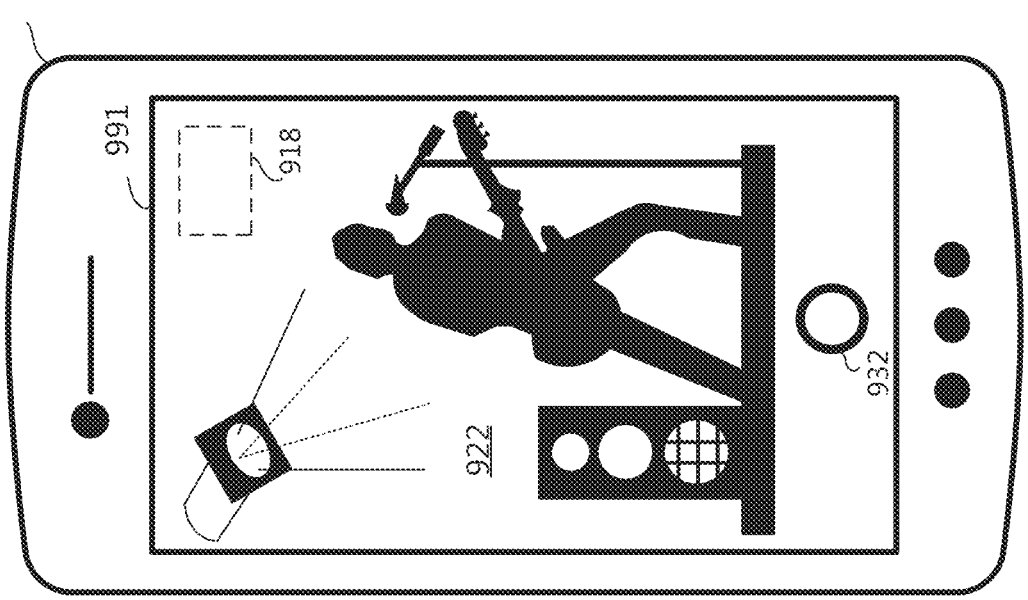
FIGS. 9A and 9B illustrate a mobile device having a display that includes user inputs to facilitate live streaming of retrospectively captured images, according to an embodiment.
Figure 9A:
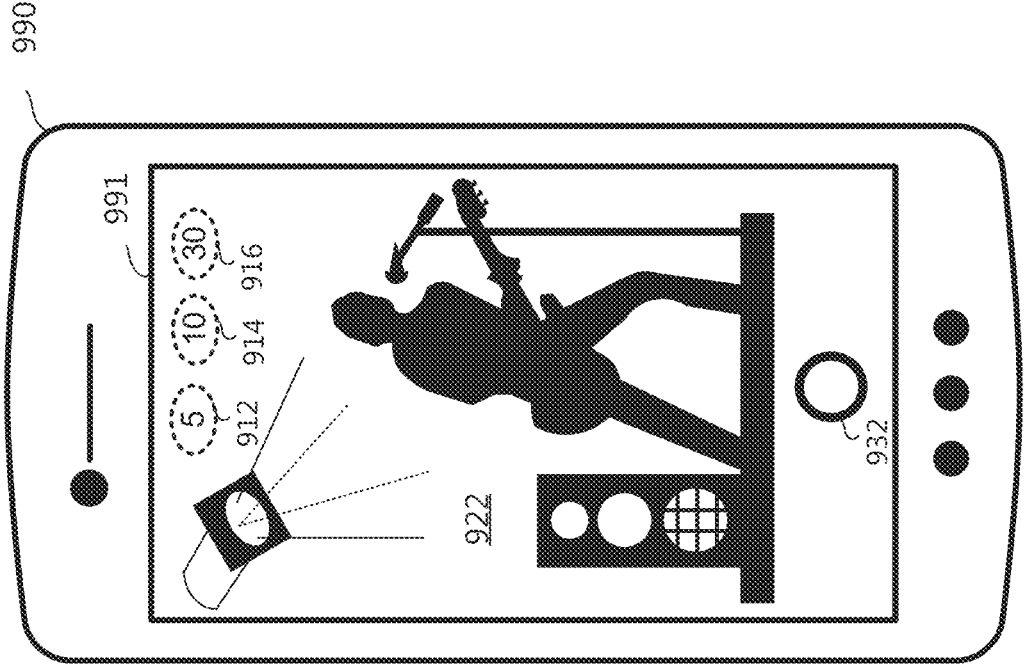

FIGS. 9A and 9B illustrate a mobile device 990 having a display 991 that includes user inputs to facilitate live streaming of retrospectively captured images, in accordance with embodiments of the disclosure. In FIG. 9A, software buttons 912, 914, and 916 are rendered to display 991. Software button 912 corresponds to a time period of 5 seconds, software button 914 corresponds to a time period of 10 seconds, and software button 916 corresponds to a time period of 30 seconds, in the illustrated embodiment. As those skilled in the art appreciate, more or less software buttons may be rendered to the display 991 and different time periods may correspond to different software buttons. In the illustrated embodiment, software buttons 912, 914, and 916 are overlaid over a stream of images (video) being rendered to display 991 in real time (as the images are captured).

In one example context, a user of mobile device 991 is attending a concert and recording a provisional video that includes video footage of scene 922 of the concert. As explained above, often times not all video footage is worth saving or sharing with friends, via social media for example. Therefore, the user may press record button 932 to initiate a provisional video capture of the concert scene 922.

After the user presses record button 932, on mobile device 990, the portable video recorder within mobile device 990 may continuously capture a stream of images using a capture element (e.g. CMOS image sensor) of the portable video recorder. The stream of images captured may be simultaneously presented to the user (e.g. via display 991) and transmitted to the provisional memory. Each image of the stream of images is held in provisional memory for a period of time as provisional data in the provisional memory included in the portable video recorder. The period of time the provisional data is held in provisional memory may be 30 seconds, one minute, or five minutes, for example. The period of time that the provisional data is held in provisional memory may be selected by the user of mobile device 990.

The portable video recorder may then receive a user-initiated trigger signal from a user interface included in the portable video recorder. In one embodiment, the user interface is a resistive or capacitive touch screen of mobile device 990 that overlays the display 991. Mobile device 990 may include a smartphone or a tablet, for example. In FIG. 9A, the user-initiated trigger signal may be the user pressing/selecting one of the software buttons 912, 914, or 916. Upon receiving the user-initiated trigger signal, a live stream session including a selected portion of the provisional data is initiated. The selected portion of the provisional data corresponds only to events captured prior to receiving the user-initiated trigger signal.

After receiving the user-initiated trigger signal, the portable video recorder may capture a subsequent stream of images and send the subsequent stream of images to the wireless radio as part of the live stream session. In the live stream session, the subsequent stream of images follows the selected portion of the provisional data. The subsequent stream of images may be rendered to display 991 in real time as they are captured by the capture element.

Initiating the live stream session may include encapsulating the selected portion of the provisional data and the subsequent stream of images with a GTPv2 (GPRS Tunneling Protocol) tunnel. The live stream session may be packetized and converted to different formatting to conform with different live stream, cellular data (e.g. 3G, 4G, LTE), WiFi (e.g. IEEE 802.11), or BlueTooth protocols in order to transmit the live stream session from the wireless radio to an application or media server that facilitates broadcasting the live stream session. In one embodiment, the live stream session is transmitted to a social media application or social media database and social media followers, friends and/or contacts of the user have access to view the live stream. It is understood that a device that includes the portable video recorder may transmit the live stream session to an application server or media server through one or more intermediary devices. For example, the portable video recorder (e.g. wireless connected camera) may send the live stream session to a mobile device via BlueTooth or WiFi, and the mobile device may then forward the live stream session to the application or media server through a wireless router via WiFi.

Figure 10:
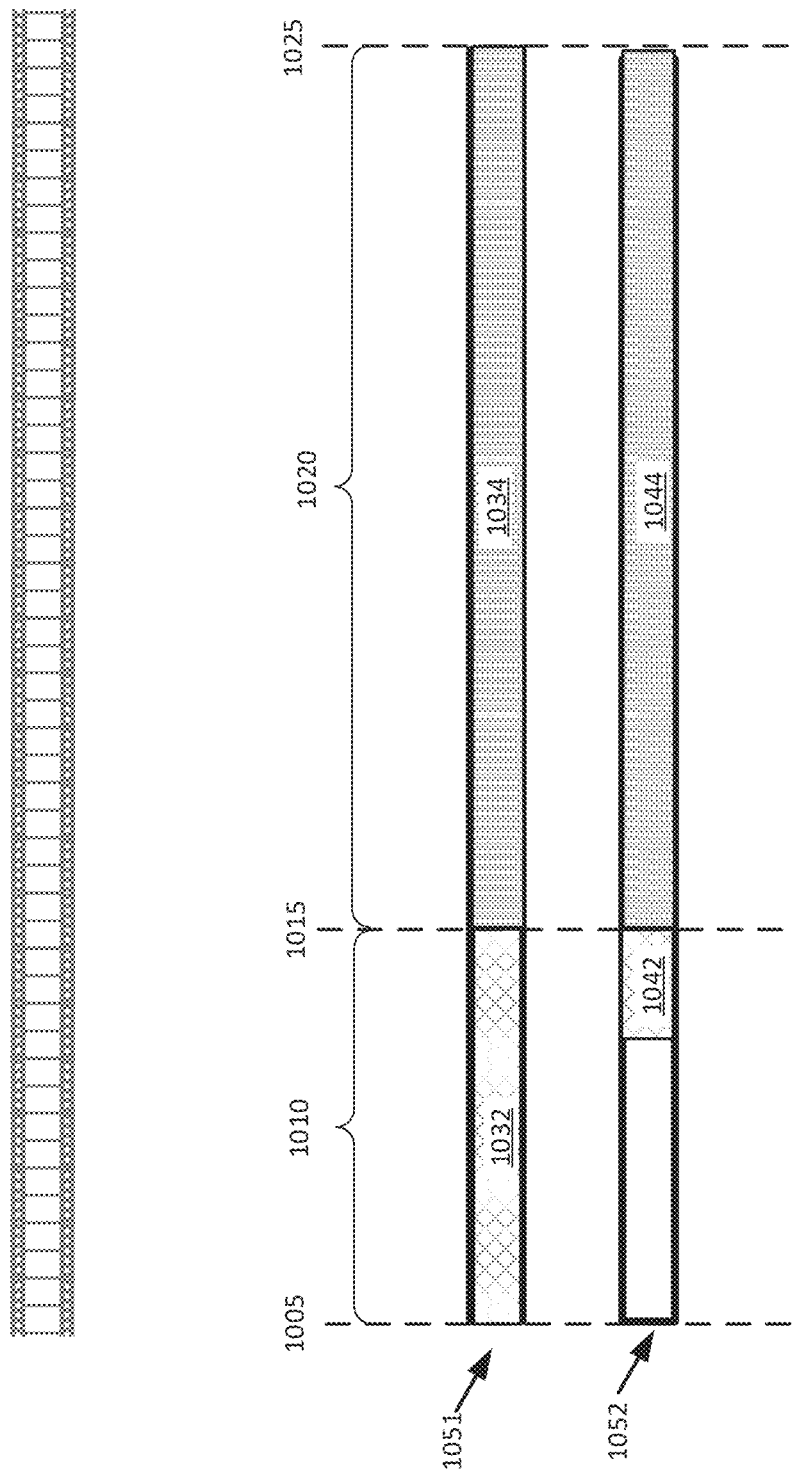
FIG. 10 illustrates timelines of live streams that include retrospectively captured images, according to an embodiment.

FIG. 10 illustrates timelines of live streams that include retrospectively captured images, in accordance with embodiments of the disclosure. Live stream 1051 includes selected provisional data 1032 and subsequent stream of images 1034. Live stream 1052 includes selected provisional data 1042 and subsequent stream of images 1044. A provisional data input may be received by a touch-screen interface overlaying a mobile device (e.g. mobile device 990) and an image sensor of the mobile device may continuously capture a stream of images in response to receiving the provisional data input. In one embodiment, period of time 1010 is 30 seconds which is the period of time that provisional data is stored.

In example live stream 1051, at least 30 seconds of provisional data is captured after receiving the provisional data input and the user-initiated trigger signal is received at 1015. In live stream 1051, 30-second software button 916 was selected, which authorizes an initiation of a live stream session that includes the last 30 seconds of provisional data 1032 which includes 30 seconds of retrospectively captured images. Live stream 1051 also includes subsequent stream of images 1034 captured in time period 1020. In one embodiment, live stream 1051 will continue to broadcast the subsequent stream of images 1034 until the mobile device receives an end live stream input at 1025. The end live stream input at 1025 may be the user pressing the record button 932.

In example live stream 1052, at least 30 seconds of provisional data is captured after receiving the provisional data input and the user-initiated trigger signal is received at 1015. In live stream 1052, 10-second software button 914 was selected, which authorizes an initiation of a live stream session that includes the last 10 seconds of provisional data 1032 which includes 10 seconds of retrospectively captured images. Not all of the provisional data is selected in live stream 1052 since only 10 seconds of the available 30 seconds (example of period of time 1010) of provisional data is included in live stream 1052. Live stream 1052 also includes the subsequent stream of images 1044 captured in time period 1020. In one embodiment, live stream 1052 will continue to broadcast the subsequent stream of images 1044 until the mobile device receives an end live stream input at 1025. The end live stream input at 1025 may be the user pressing the record button 932.

Therefore, example live streams 1051 and 1052 illustrate a potentially advantageous method of a user of a mobile device 990 live streaming retrospectively captured images. In the context of a concert, the user may press the record button 932 and record provisional data for an indefinite period of time (e.g. minutes), while not recording anything the user elects to share. However, at some point in time during the provisional recording, a notable event (e.g. light show or start of certain song) happens that the user would like to live stream. The user may prefer not to live stream the minutes leading up to the notable event, but may prefer to share some period of time (e.g. 10 seconds) leading up to the notable event to give a viewer/consumer of the images context surrounding the notable event. The embodiment shown in FIG. 9A allows the user to select how much time of retrospectively captured images (stored as provisional data) to share in a live stream by simply selecting a software button having the corresponding amount of time of retrospectively images to share. One potential advantage of the embodiment of FIG. 9A includes a 1-click initiating of a live stream of retrospectively captured images and subsequently captured images. The 1-click ability allows the user to both stay in the moment of the event/scene being captured as well as sharing the captured images in a live stream. The ease of the 1-click ability also may assist in allowing the user of mobile device 990 to concentrate on continuing to capture the scene rather than engaging in a lengthy editing and/or live stream initiation procedure. In some embodiments, software button 912, 914, 916 may be replaced by software toggle switches or swiping interfaces.

FIG. 9B is similar to FIG. 9A although in FIG. 9B, software buttons 912, 914, and 916 are replaced by a selectable time period input 918 that is overlaid over the stream of images being presented to the user via display 991. In FIG. 9B, a user can tap input 918 and enter a number of seconds as a requested time period into selectable time period input 918 as the selected portion of provisional data to be included in a live stream. For example, a user may type "13" into input 918 and press record button 932 to initiate a live stream with 13 seconds of retrospectively captured images. The 13 seconds is the selected portion of provisional data selected by the user in a user-initiated trigger signal, in this embodiment. The embodiment illustrated in FIG. 9B is potentially advantageous in that it allows the user to customize the time period of retrospectively captured images to be included in a live stream.

As described in FIG. 3, retrospective recorder embodiment 301 may be included in a cellular telephone and also include a radio interface that transmits retrospectively captured images. In FIG. 4, antenna 402 receives radio signal 308 and may transmit the received image data of radio signal 308 to a server 410 via network 406. In embodiments of the disclosure, a live stream session that includes retrospectively captured images is transmitted from a wireless radio of a portable video recorder to a wireless node and then onto a server for broadcasting/distribution. Once a user interface (e.g. buttons or touch screen) of a portable video recorder receive a command from a user to initiate a live stream session, initiating the live stream session may include transmitting at least a portion of the provisional data to the wireless radio for transmitting to a server (e.g. server 410). The wireless radio may be configured to transmit the live stream session via cellular data (e.g. 3G, 4G, LTE) WiFi (e.g. IEEE 802.11) or a short-range wireless protocol (e.g. BlueTooth) to reach the intended server.

In embodiments where the live stream session includes both retrospectively captured images and a subsequent stream of images, the portable video recorder may include an electronic controller configured to cause the capture element to capture a subsequent stream of images and send the subsequent stream of images to the wireless radio as part of the live stream session. The subsequent stream of images may follow the selected portion of the provisional data (that includes the retrospectively captured images) in the live stream session.

The selected portion of the provisional data may be the first images in the live stream session. In one embodiment, the selected portion of the provisional data includes all the provisional data stored in the provisional memory. In another embodiment, less than all of the provisional data is selected by the user as the selected portion of the provisional data. The live stream initiation may include packetizing the images into packets for wireless and wired transmission over a network. Initiating the live stream session may include transmitting routing data associated with live stream session to an application server that routes the live stream session to consumer devices of the live stream session. In one embodiment, initiating the live stream session includes generating a packet header including packet data and combining the packet header data with the selected portion of the provisional data. Each next packet of the live stream session may be the oldest image captured by the portable video recorder that hasn't yet been transmitted as part of the live stream session. When a stop recording input is received from a user (e.g. pressing record button 932 after initiating the live stream session), buffering for the live stream session may be halted. Each image recorded prior to receiving the stop recording input may be transmitted from memory to the wireless radio as packets of the live stream session even though the transmission of those packets occurs after receiving the stop recording input. When all the images captured prior to receiving the stop recording input are transmitted as part of the live stream, an EOT (End Of Transmission) indicator is added to a last packet of the live stream session that is transmitted by the wireless radio, in one embodiment.

In one embodiment, initiating the live stream session includes generating data indicating the live stream session includes retrospectively captured content and sending the data to the wireless radio of the portable video recorder as part of the live stream session. In one embodiment, initiating the live stream session includes sending a hashtag to the wireless radio as part of the live stream session. The hashtag may be entered or selected by the user of the portable video recorder or mobile device to be associated with the live stream session.

In some embodiments, the portable video recorder may include an image sensor, a digital signal processor, a processor, and memory of the mobile device 990 to facilitate live streaming, for example. The image sensor may be a rear-facing image sensor or a front-facing image sensor.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, digital image capture device, mobile device, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.). While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method, comprising:
    starting a portable video recorder after power-on to enter a ready state, the portable video recorder including at least a capture apparatus, a user interface, and a provisional memory;
    while in the ready state, after receiving a user-initiated provisional video capture signal from the user interface, continuously capturing a stream of images using the capture apparatus of the portable video recorder; simultaneously presenting the stream of images to a user and transmitting the captured stream of images to the provisional memory of the portable video recorder; and holding each image of the stream of images only for a period of time as provisional data in the provisional memory included in the portable video recorder;
    receiving a user-initiated trigger signal from the user interface included in the portable video recorder; and
    upon receiving the user-initiated trigger signal, initiating a substantially-live stream session, while said continuously capturing the stream of images proceeds, that includes a selected portion of the provisional data stored in the provisional memory, the selected portion corresponding only to events beginning a predetermined non-zero time period before the user-initiated trigger signal and ending at the time of the user-initiated trigger signal,
    wherein said initiating the substantially-live stream session includes:
        creating a mark indicating content of the provisional memory starting from the predetermined non-zero time period earlier than the user-initiated trigger signal;
        transferring the selected portion of the provisional data from the provisional memory, with the mark, to a wireless radio of the portable video recorder to cause streaming transmission of the substantially-live stream session.

2. The method of claim 1 further comprising:
    upon completing the sending of the selected portion of the provisional data to the wireless radio of the portable video recorder, sending a subsequent stream of images to the wireless radio as part of the substantially-live stream session, the subsequent stream of images captured via said continuously capturing the stream of images following the selected portion of the provisional data in the substantially-live stream session.

3. The method of claim 2, wherein the subsequent stream of images is rendered to a display of the portable video recorder in real time.

4. The method of claim 2, wherein initiating the substantially-live stream session further includes encapsulating the selected portion of the provisional data and the subsequent stream of images within a GTPv2 (GPRS Tunneling Protocol) tunnel.

5. The method of claim 1, wherein the user interface includes a display, and the method further comprises:
rendering one or more software buttons to the display, each of the software buttons corresponding to respective different time periods, wherein receiving the user-initiated provisional video capture signal includes receiving a selection of one of the software buttons, and wherein the predetermined non-zero time period for the selected portion of the provisional data is the respective time period corresponding to the selected software button.

6. The method of claim 5, wherein the software buttons are overlaid over the stream of images presented to the user.

7. The method of claim 1, wherein the user interface includes a display, and the method further comprises:
rendering a selectable time period input to the display, wherein receiving the user-initiated provisional video capture signal includes receiving a requested time period in the selectable time period input, the predetermined non-zero time period for the selected portion of the provisional data being the requested time period.

8. The method of claim 7, wherein the time period selection input is overlaid over the stream of images presented to the user.

9. The method of claim 1, wherein the selected portion of the provisional data are the first images in the substantially-live stream session.

10. The method of claim 1, wherein the selected portion of the provisional data includes all of the provisional data stored in the provisional memory.

11. The method of claim 1, wherein initiating the substantially-live stream session includes:
generating data indicating the substantially-live stream session includes retrospectively captured content; and
sending the data to the wireless radio of the portable video recorder as part of the substantially-live stream session.

12. The method of claim 1, wherein initiating the substantially-live stream session includes sending a hashtag to the wireless radio, the hashtag received from the user of the portable video recorder.

13. The method of claim 1, wherein initiating the substantially-live stream session includes transmitting routing data associated with the substantially-live stream session to an application server that routes the substantially-live stream session to consumer devices of the substantially-live stream session.

14. The method of claim 1, wherein initiating the substantially-live stream session includes:
generating a packet header including packet header data; and combining the packet header data with the selected portion of the provisional data.

15. The method of claim 1, wherein
a next packet transmitted in the substantially-live stream session is an oldest image captured by the portable video recorder;
wherein said initiating the substantially-live stream session further includes packetizing the selected portion of the provisional data, and
each next packet transmitted from the wireless radio in the substantially-live stream session includes an oldest unsent image captured by the portable video recorder.

16. The method of claim 1, wherein buffering for the substantially-live stream session is halted when the portable video recorder receives a stop recording input from the user.

17. The method of claim 1, wherein each image recorded prior to receiving the stop recording input is transmitted to the wireless radio as packets.

18. The method of claim 1, wherein an EOT (End of Transmission) indicator is added to a last packet of the substantially-live stream session that is transmitted by the wireless radio.

19. The method of claim 1 further comprising:
ending the substantially-live stream session upon receiving a second trigger signal.

20. A non-transitory machine-accessible storage medium that provides instructions that, when executed by a portable video recorder, causes the portable video recorder to perform operations comprising:
starting a portable video recorder after power-on to enter a ready state, the portable video recorder including at least a capture apparatus, a user interface, and a provisional memory;
while in the ready state, after receiving a user-initiated provisional video capture signal from the user interface, capturing a stream of images using the capture apparatus of the portable video recorder; storing the captured stream of images to the provisional memory of the portable video recorder; and holding each image of the stream of images only for a period of time as provisional data in the provisional memory included in the portable video recorder;
receiving a user-initiated trigger signal from the user interface of the portable video recorder; and
upon receiving the user-initiated trigger signal, initiating a substantially-live stream session, while said capturing the stream of images proceeds, that includes streaming transmission of at least a portion of the provisional data, the at least a portion of the provisional data corresponding only to events beginning a predetermined nonzero time period before the user-initiated trigger signal and ending at the time of the user-initiated trigger signal, and of a subsequently captured stream of images, wherein the subsequently captured stream of images is captured by the capture apparatus of the portable video recorder subsequent to receiving the user-initiated trigger signal,
wherein said initiating the substantially-live stream session includes:
creating a mark indicating content of the provisional memory starting from the predetermined nonzero time period earlier than the user-initiated trigger signal;
transferring the portion of the provisional data from the provisional memory with the mark to a wireless radio of the portable video recorder to cause streaming transmission of the substantially-live stream session.

21. The non-transitory machine-accessible storage medium of claim 20, wherein the subsequently captured stream of images follows the at least a portion of the provisional data in the substantially-live stream session.

22. The non-transitory machine-accessible storage medium of claim 20, wherein the at least a portion of the provisional data includes all of the provisional data.

23. The non-transitory machine-accessible storage medium of claim 20, wherein the substantially-live stream session continues to stream the subsequently captured stream of images until a second user-initiated trigger signal is received.

* * * * *